United States Patent
Palmer

(10) Patent No.: US 7,174,601 B1
(45) Date of Patent: Feb. 13, 2007

(54) MOPPING SYSTEM AND METHOD OF USE

(75) Inventor: Robert Palmer, Artesia, CA (US)

(73) Assignee: Spin Mop, Inc., Las Vegas, NV (US)

( * ) Notice: Subject to any disclaimer, the term of this patent is extended or adjusted under 35 U.S.C. 154(b) by 0 days.

(21) Appl. No.: 11/204,550

(22) Filed: Aug. 16, 2005

(51) Int. Cl.
*A47L 13/58* (2006.01)
*A61L 2/20* (2006.01)

(52) U.S. Cl. .......................... 15/260; 15/264
(58) Field of Classification Search ........... 15/260, 15/263, 264, 245
See application file for complete search history.

(56) References Cited

U.S. PATENT DOCUMENTS

| | | | |
|---|---|---|---|
| 217,675 A | 7/1879 | Boswell | |
| 4,135,269 A | 1/1979 | Marston | |
| 4,344,201 A | 8/1982 | Trisolini | |
| 4,464,809 A | 8/1984 | Trisolini | |
| 4,561,141 A | 12/1985 | Trisolini | |
| 4,908,904 A | 3/1990 | Smith, Jr. | |
| 2005/0115098 A1* | 6/2005 | Rust et al. | 34/58 |

FOREIGN PATENT DOCUMENTS

| | | | |
|---|---|---|---|
| JP | 3-55022 | * | 3/1991 |
| JP | 11206666 A2 | | 8/1999 |
| WO | WO 92/14394 | * | 9/1992 |

* cited by examiner

*Primary Examiner*—Randall Chin
(74) *Attorney, Agent, or Firm*—QuickPatents.com; Kevin Prince

(57) ABSTRACT

A mopping system and methods of its use are disclosed. A mop assembly includes a mop head that is adapted to be spun around a generally vertical rotational axis thereof when the mop head is fixed within a mop head spinning means of a bucket assembly. When the mop head is spun at a relatively high rate of rotational speed, water retained in the mop is forcefully dispelled from the mop by centrifugal force. The water leaves the mop and is retained within a spin chamber of the bucket assembly. A drain plunger is included to allow the collected water to be drained from the bucket assembly. An ozone generator may be included for introducing ozone gas into the collected fouled water in the spin chamber. A clean water tank with a pump and spraying means, mounted within the spin chamber just below the mop head when the mop head is engaged with the mop head spinning means, is preferably included to allow introduction of clean water to the moping surface of the mop head. The mop assembly may include a lever means for selectively detaching the mop head from the handle. A control circuit controls the spraying of clean water onto the mop head, the ozone generator, and the activation and speed of the mop head spinning means, such that various wash-dry cycles are available.

15 Claims, 3 Drawing Sheets

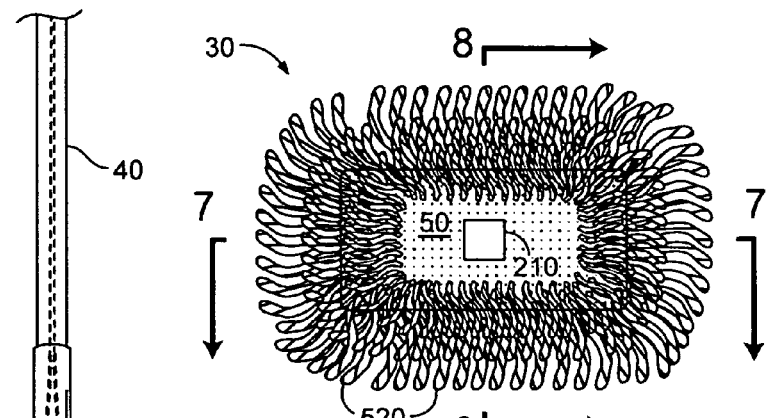
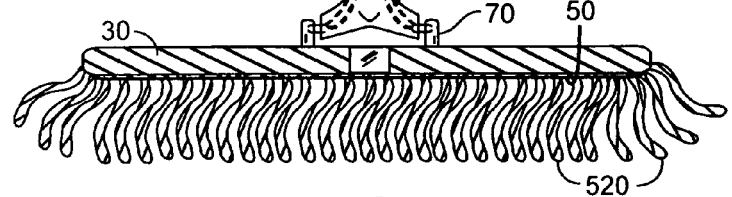
FIG. 7
FIG. 6
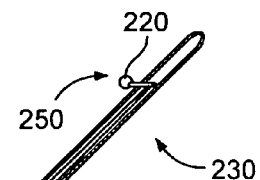
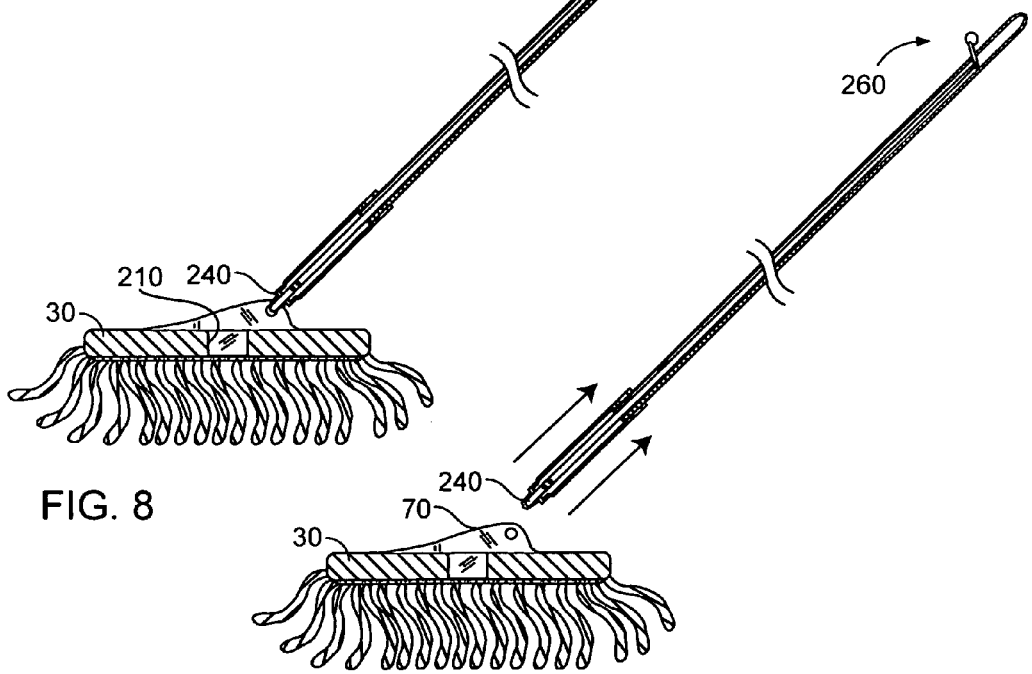
FIG. 8
FIG. 9

MOPPING SYSTEM AND METHOD OF USE

FIELD OF THE INVENTION

This invention relates to mops, and more particularly to a mop that has a mop head adapted for spin drying within a motorized bucket assembly.

DISCUSSION OF RELATED ART

Conventional mops used in retail and commercial locations such as restaurants, shopping malls, and the like are typically of the type having an elongated handle and a string cloth mop head. A wheeled bucket is usually included that contains either one compartment for a clean water solution, or two compartments for holding the clean water solution and fouled water. A wringer may be included to wring-out the mop into the fouled water compartment.

In use, the mop is wrung-out and submerged into the clean water solution so as to absorb a quantity thereof. Such clean water may also include a cleaning agent such as bleach, or the like. The mop is then applied to the floor where it deposits a layer of the clean water solution and, simultaneously, picks-up dirt, grease and other water-fouling material. The mop, now contaminated, is then wrung-out, and the mop is once again submerged into the clean water solution. However, at this point not all of the contaminants have been removed from the mop in the wringing process, and a significant amount of water fouling material is deposited into the clean water compartment. As a result, it is not long before there is little distinction between the two compartments, both containing fouled water.

In prior art mop buckets with only a single bucket compartment, the problem is compounded by the fact that dirt that is removed from the mop and wrung-out into the water compartment can be immediately picked-up again by the mop and re-applied to the floor surface that is being mopped. Mopping with such prior art buckets quickly becomes an exercise in futility, as applying contaminated water to a contaminated floor does little to clean the floor. Further, often the employees who are charged with mopping the floor are indifferent as to whether or not the process actually cleans the floor, the result being poor sanitary conditions throughout the establishment.

Moreover, to make conditions worse, in practice many mop buckets are not emptied for days, the same fouled water sitting stagnant, a perfect media for bacteria and other biologically active organisms to thrive and multiply. Instead of cleaning the floors in a retail establishment, mopping with such a universal mopping bucket can often do more to contaminate the floors with dangerous biological agents than not mopping at all.

Several improved wringing devices have been invented that attempt to overcome the aforementioned drawbacks with the prior art. Such devices strive to more thoroughly clean the mop during the wringing process. For example, U.S. Pat. Nos. 4,464,809 and 4,344,201, issued on Aug. 14, 1984 and Aug. 17, 1982, both to Trisolini, disclose a mop with a rotating head that cooperates with a rotating mop wringer that is spun by a motorized bucket. The mop wringer takes the form of a perforated basket, and strands of the mop are thrown against the side walls thereof, whereby water and dirt are extracted from the mop. However, the perforated basket of such a device applies not only centrifugal force to the strands of the mop, but also centripetal force, which serves to keep particles of dirt and debris in the mop head. The force of the strands against the perforations of the basket can actually block water and dirt flow out of the mop strands. Thus, while such a device is better at removing dirt and water from the mop, it is by no means optimal at such. A further drawback to the Trisolini devices is that they are somewhat tall in their profile, and are therefore more difficult to store and maneuver. Further, such prior art mop assemblies are heavy due to the hollow cleaning fluid chamber therein, and as such a person mopping with such a device can quickly become exhausted.

Another prior art device, also to Trisolini, is described in U.S. Pat. No. 4,561,141 issued on Dec. 31, 1985. This device incorporates a motor and a wringing basket into the mop assembly, for providing a self-wringing mop. The main drawback with such a device is, again, the mop of such a device is heavy and quickly becomes exhausting to use. The motor of such a device, as well as the batteries to power it, are extra weight that the user is forced to propel around the floor while mopping.

Several improvements have been devised for sterilizing germs that may be present in the mop bucket or on the mop itself. For example, U.S. Pat. No. 4,135,269 to Marston on Jan. 23, 1979, teaches a mop bucket that includes an ultraviolet light sterilizing system. Japanese Patent Application JP11206666A2 to Akihiro on Aug. 3, 1999 teaches a bucket including an ozone generator for bubbling ozone up through the liquid contained in the mop bucket. Both such prior art inventions may accomplish their goals, but neither patent is directed towards a device for cleaning both the fouled water contained in the bucket and the mop head simultaneously. Further, such prior art devices do not include intelligent controlling means for shutting-off the sterilizing device if the bucket is empty or is not being used. Thus, one can easily inadvertently leave such a device activated, both wasting energy and possibly over-exposing the mop and surrounding areas to UV light and ozone.

Therefore, there is a need for an improved mopping system that allows for convenient, quick and thorough cleaning and drying of a mop head. Such a needed device would allow clean water or a cleaning solution to be applied to the mop head easily, and would not allow cross-contamination between the clean water solution and the fouled-water container. Moreover, such a needed device would provide for easy sterilization of the mop head and the fouled water to prevent biological growth therein, and would facilitate emptying of the fouled water. The needed device would be self-contained and easily portable from location to location as needed. Further, such a needed device would greatly improve the sanitary conditions of mopped floors, substantially eliminating re-contamination thereof by a fouled mop head. The present invention accomplishes these objectives.

SUMMARY OF THE INVENTION

The present device is a mopping system comprising a mop assembly and a bucket assembly. In the preferred embodiment, the mop assembly includes a mop head that is detachably fixed to a lower end of an elongated handle. The mop head is adapted to be spun around a generally vertical rotational axis thereof when the mop head is fixed within a mop head spinning means of the bucket assembly. As such, when the mop head is spun at a relatively high rate of rotational speed, water retained in the mop is forcefully dispelled from the mop by centrifugal force. The fouled water leaves the mop and is retained within the spin chamber, where it collects at the bottom thereof. A drain plunger is preferably included to allow the collected fouled water to be drained from the spin chamber into either a floor drain or a drain water container included with the invention. An ozone generator may be included for introducing ozone gas into the collected fouled water in the spin chamber, thus sterilizing any biologically active organisms contained therein.

A clean water tank with a pump and spraying means is preferably included to allow introduction of clean water to the moping surface of the mop head. Such a clean water tank is preferably mounted within the spin chamber just below the mop head when the mop head is engaged with the mop head spinning means. The clean water tank is sealed so that fouled water dispensed from the mop head during rotation does not contaminate the clean water or other cleaning fluid contained in the clean water tank.

The mop assembly may include a lever means for selectively detaching the mop head from the handle. As such, the user does not have to bend down to engage the mop head with the mop head spinning means of the bucket assembly. Alternately, the mop head may be rotationally fixed to the elongated handle such that it can only spin around its rotational axis when engaged with the mop head spinning means.

The present invention is an improved mopping system that allows for convenient, quick and thorough cleaning and drying of a mop head. The present device allows clean water or a cleaning solution to be applied to a mop head easily, and prevents contamination between a clean water solution and a fouled-water container. Moreover, the present invention provides for easy sterilization of the mop head and the fouled water to prevent biological growth therein, and allows for easy, hands-free emptying of the fouled water. The invention is self-contained, easily portable from location to location as needed, and greatly improve the sanitary conditions of floors mopped therewith, substantially eliminating re-contamination thereof by a fouled mop head. Other features and advantages of the present invention will become apparent from the following more detailed description, taken in conjunction with the accompanying drawings, which illustrate, by way of example, the principles of the invention.

DESCRIPTION OF THE DRAWINGS

FIG. 6 is a bottom plan view of the mop head of the invention, illustrating a lower surface thereof and a plurality of water absorbing strands;

FIG. 7 is a cross-sectional view of the invention, taken generally along lines 7—7 of FIG. 6, illustrating a handle attachment means of the mop head and a mop head attachment means of an elongated mop handle;

FIG. 8 is a cross-sectional view of the invention, taken generally along lines 8—8 of FIG. 6, illustrating in more detail the handle attachment means of the mop head and the mop head attachment means of the elongated mop handle; and FIG. 9 is a cross-sectional view of the invention, taken generally along lines 8—8 of FIG. 6, illustrating the mop head being detached from the elongated handle.

DETAILED DESCRIPTION OF THE PREFERRED EMBODIMENT

Figure 1:
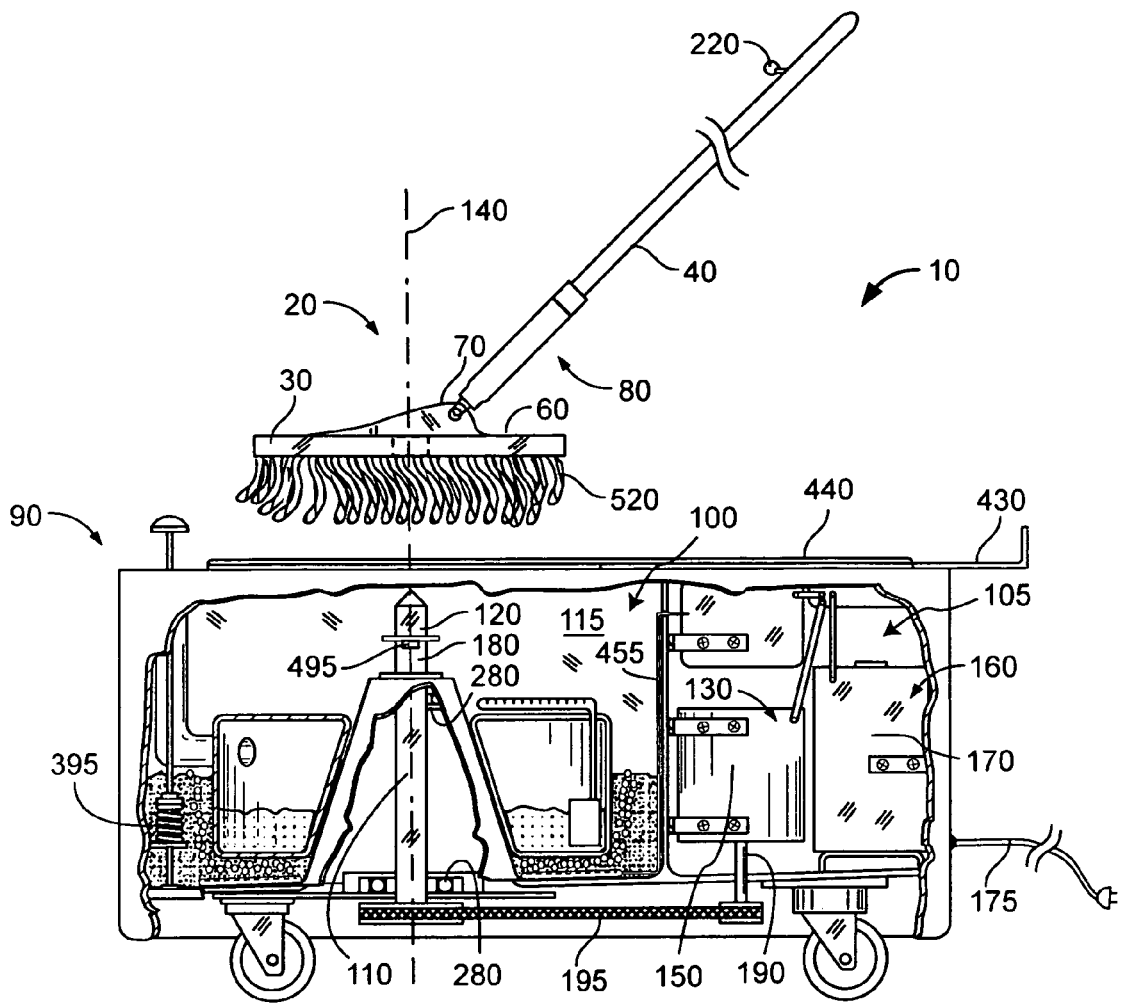
FIG. 1 is a cut-away left-side elevational view of the invention, illustrating a mop assembly of the present invention in a position to engage a mop head thereof with a bucket assembly of the present invention.

FIG. 1 illustrates a mopping system 10 of the present invention. In its simplest form, the mopping system 10 comprises a mop assembly 20 and a bucket assembly 90. The mop assembly includes a mop head 30 preferably pivotally attached to an elongated handle 40. The mop head 30 includes a floor-engageable lower surface 50 (FIG. 78) and an opposing upper surface 60. The mop head 30 includes a handle attachment means 70, preferably on the upper surface 60, for attaching the mop head 30 to a lower end 80 of the handle 40 (FIGS. 7–9). The handle attachment means 70 could also be provided on a peripheral edge of the mop head 30 (not shown).

The mop head 30 is preferably detachable from the elongated handle 40 so that the mop head 30 may be easily spun in the bucket assembly 90 without the need to also spin the handle 40. However, such an arrangement is not necessarily required in an embodiment of the invention that allows for spinning the entire mop assembly 20 by aligning the longitudinal axis of the handle with the rotational axis 140 of the mop head.

Such an embodiment notwithstanding, the preferred embodiment of the invention includes a biased lever means 220 at an upper end 230 of the handle 40 mechanically coupled to a mop head attachment means 240 fixed to the lower end 80 of the handle 40. The mop head attachment means 240 of the handle 40 and the handle attachment means 70 of the mop head 30 cooperate to retain the mop head 30 in a pivotable fashion on the lower end 80 of the handle 40 when the lever means is in a normal position 250 (FIG. 8). When the lever means 220 is placed in an actuated position 260 (FIG. 9), the mop head attachment means 240 of the handle 40 and the handle attachment means 70 of the mop head 30 cooperate to mechanically disconnect the mop head 30 from the lower end 80 of the handle 40. The lever means 220 is preferably a lever as illustrated in FIGS. 8 and 9, however, a biased spring button or knob may also be used, as could a variety of different mechanical couplings. Linkages between the upper end 230 and lower end 80 of an elongated handle 40 are known in the prior art, and the preferred embodiment herein described is just one such known method. The important feature of this embodiment is that the mop head 30 may be easily detached from the handle 40, preferably without the operating having to bend down.

The mop head 30 preferably includes a plurality of water absorbing strands 520 attached to the lower side 50 thereof. Such strands 520 may be made from cotton, felt, or other water absorbing material. Such strands 520, however, are made from a material that will release water when subjected to a strong centrifugal force. The mop head 30 is preferably rectangular in plan view (FIG. 6), but could also be either circular or square or any other suitable shape, provided that the mop head 30 has a center of gravity proximate its longitudinal axis 140 so as to remain balanced when spinning, as described below.

Figure 3:
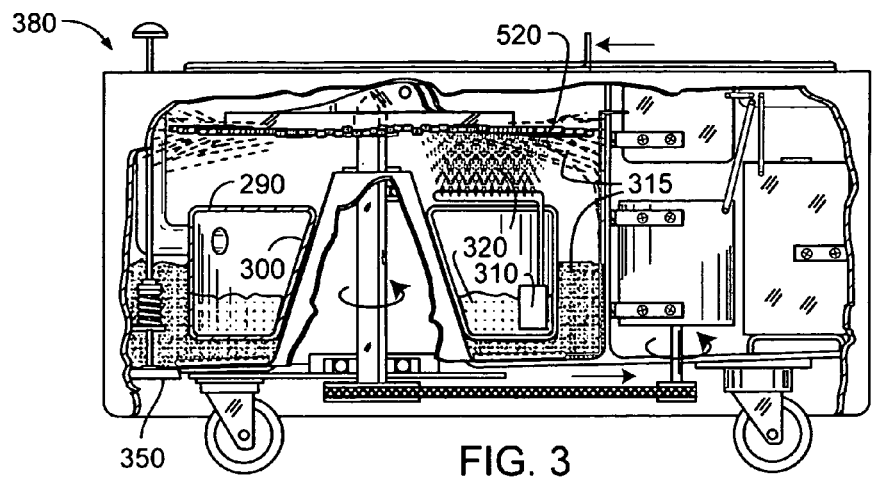
FIG. 3 is a cut-away left-side elevational view of the invention, illustrating a spinning mop head rotated by a mop head spinning means of the invention, and further illustrating dirty water being flung away from the mop head while clean water is sprayed to an underside of the mop head.

The bucket assembly 90 preferably includes a spin chamber 100 complete contained therewithin, and a mop head spinning means 110. The mop head spinning means 110 is engageable with the mop head 30 to rotationally support the mop head 30 within the spin chamber 110, away from an inner wall 115 thereof (FIG. 3). As such, when spun around the rotational axis 140, the distance to the edge of the mop head 30 and the centrifugally extended strands 520 must be less than the distance between the shaft 180 and the inner wall 115 of the spin chamber 110. As such, water in a strand 520 is not constrained by the inner wall 115 and is free to exit the strand 520.

It will be appreciated by those skilled in the art that the mop head spinning means 110 can take various forms. Preferably, as illustrated in FIGS. 1–5, the mop head spinning means includes a mop head engagement means 120 such as a shaft 180 having a non-circular cross-section. The non-circular shaft 180 is vertically and rotationally supported within the spin chamber 100 by a pair of bearings 280 each centrally supported by the spin chamber 100. A rotational driving means 130, such as an electric motor 150 with a rotating shaft 190, is connected to the mop head spinning means 10 through a mechanical linkage 195 therebetween (FIG. 1), such as a cog belt 195 with pulleys 200 (FIG. 2) on the shafts 180, 190. In this manner the motor 150 may be isolated in a dry chamber 105 (FIG. 2) of the bucket assembly 90, away from any moisture or standing liquid 315. Further, the rotational speed of the shaft 180 may be differed as desired from that of the motor 150 through use of varying-sized pulleys.

In the preferred embodiment of the invention, the spin chamber 100 is generally a toroid-shaped enclosure open at its top end and having an inverted frustoconical inner wall 270 centrally located therewithin. The bearings 280 are fixed to the lower outer surface of the inner wall 270 and are co-aligned to allow the shaft 180 to be supported co-axially and substantially vertically therewithin. A seal is included on the shaft 180 where the shaft 180 penetrates the inner wall 270 and protrudes into the spin chamber 100.

It would be obvious to one skilled in the art to directly couple a motor 150 to the shaft 180 such that the motor is within the inner wall 270, directly under the mop head 30 when the mop head 30 is engaged to the mop head engagement means 120. The inner wall 270 would, in such an embodiment, constitute the dry chamber 105. Other arrangements could be used for the mop head spinning means 110, as well, as known in the prior art. What is vital to the design, however, is that water is prevented from entering the motor 150 or any other electronic components, as discussed further below.

Located just below the mop head 30 when the mop head 30 is engaged to the shaft 180 is a generally toroid-shaped clean water tank 290 having an inverted frustoconical aperture 300 formed therein (FIGS. 1–5). The clean water tank 290 rests on the inner wall 270 of the spin chamber 100, its longitudinal axis coinciding with that of the shaft 180. The clean water tank 290 includes a pump and spraying means 310 for pumping clean water 320 from the clean water tank 290 and spraying the clean water 320 onto the lower surface 50 of the mop head 30. The pump and spraying means 310 is preferably an electric pump fixed proximate to the lower inside surface of the clean water tank 290 that pumps clean water 320 up to an inverted spray nozzle fixed to the top outside surface of the tank 290 (FIG. 3). The clean water 320 may obviously be a cleaning liquid as opposed to clean water, per se, but the clean water 320 is isolated from any fouled water 315 leaving the mop head 30 due to the clean water tank 290 being generally sealed. A water inlet port 500 may be included, the water inlet port 500 being in fluid communication with, such as with a hollow pipe, the clean water tank 290 (FIGS. 1–5). The water inlet port 500 preferably exits the bucket assembly 90 at a top side 440 thereof. As such, clean water 320 or other cleaning fluids may be introduced into the water inlet port 500 in order to refill the clean water tank 290 without having to remove the clean water tank 290 from the spin chamber 100.

Figure 2:
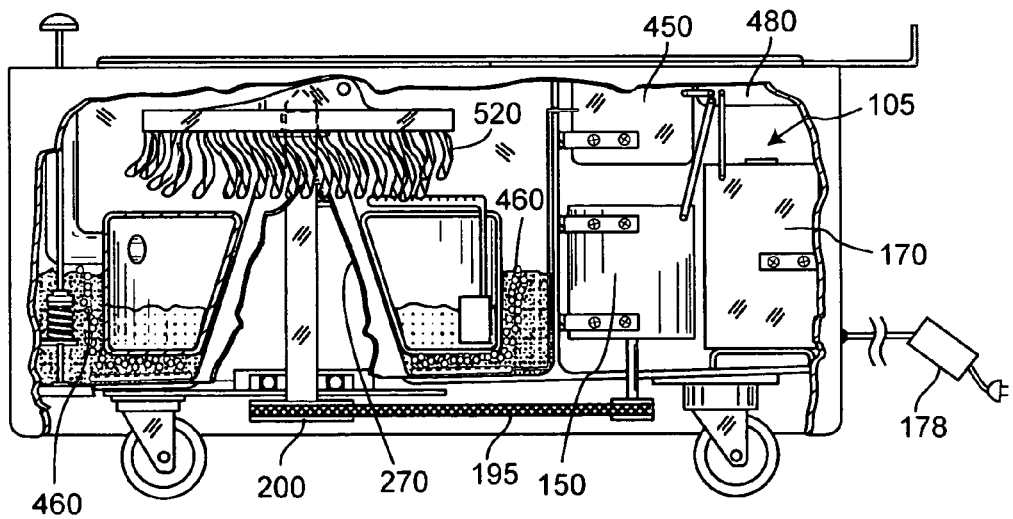
FIG. 2 is a cut-away left-side elevational view of the invention, illustrating the mop head as engaged with a mop head engagement means of the bucket assembly.
Figure 4:
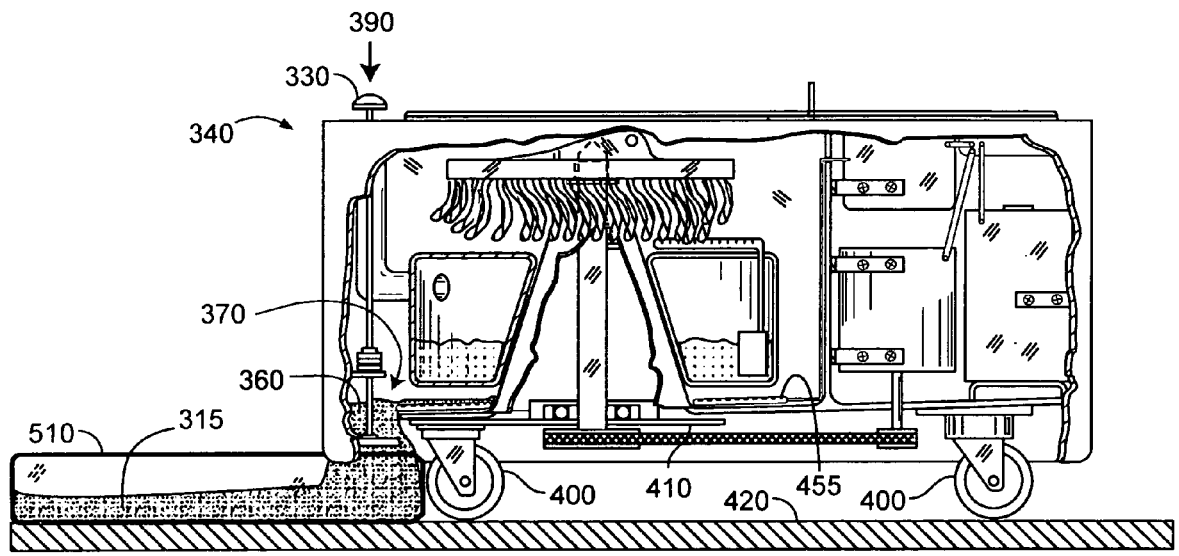
FIG. 4 is a cut-away left-side elevational view of the invention, illustrating a drain plunger being actuated to drain a spin chamber of the invention of dirty water.
Figure 5:
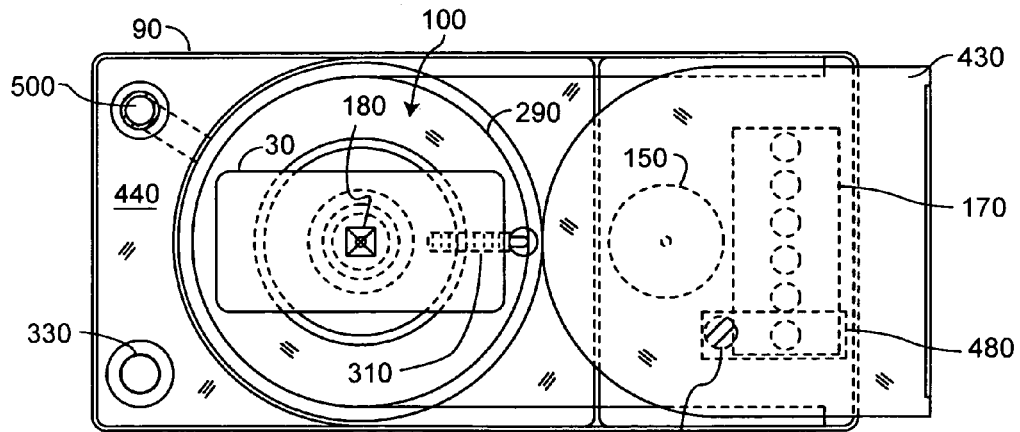
FIG. 5 is a top plan view of the invention, showing a mop head as engaged with a non-circular shaft of the mop head spinning means.

A drain plunger 330 protrudes from one end 340 of the bucket assembly 90 and extends down through the bucket assembly 90 to a rubber seal 350. The rubber seal 350 seals a drain aperture 360 in the lower-most section 370 of the spin chamber 100. The drain plunger 330 is biased upward such that the rubber seal 350 engages and seals the drain aperture 360 in a normal position 380 thereof (FIGS. 1–3). When the drain plunger 330 is placed in an actuated position 390, against a biasing element such as a spring 395, the drain plunger 330 causes the rubber seal 350 to disengage the drain aperture 360 of the spin chamber 100, resulting in the draining of any fouled liquid 315 from the bucket assembly 90 (FIG. 4).

Preferably a drain water container 510 is also included, open on its top side and adapted to fit under the drain aperture 360 between the bucket assembly 90 and a floor surface 420. The bottom inside surface of the spin chamber 100 is slightly tilted towards the drain aperture 360 so that fouled water 320 within may be completely drained by gravity when the drain plunger 330 is actuated. A plurality of wheels 400 on the bottom surface 410 of the bucket assembly 90 maintain the bucket assembly 90 above the floor surface 420. Preferably at least two of the plurality of wheels 400 are lockable, such that when the motor 150 is actuated the bucket assembly 90 does not oscillate or otherwise move along the floor surface 420. The bucket assembly 90 may be conveniently moved about the floor surface 420 by the operator pushing or pulling the elongated handle 40 when same is engaged with the mop head 30 and the mop head 30 is mounted on the shaft 180.

The electric motor 150 is electrically connected to a power source 170, such as a DC battery. An AC/DC adapter 178 (FIG. 2) may be used to recharge the battery, ensuring for safety that only low voltage is proximate to the bucket assembly 90. However, an AC power cord 175 for plugging into a power outlet (not shown) could also be used (FIG. 1). In either case, the power source 170 is preferably enclosed in the dry chamber 105.

The bucket assembly 90 preferably further includes a top cover 430 slidably engaged with the top surface 440 thereof for covering the mop head 30 when the mop head 30 is engaged with the mop head engagement means 120. As such, fouled water 315 cannot escape the bucket assembly 90 when the cover 430 is closed and the motor 150 is activated. Alternately, the mop head 30 may be both rotationally and pivotally attached to the elongated handle 40, such that the mop head 30 may spin with respect to the handle 40 while still attached thereto (not shown). In such an embodiment, the mop head 30 remains attached to the elongated handle 40 yet may spin freely in a rotational plane when the mop head 30 is engaged to the rotating shaft 180. The cover 430 in such an embodiment is either not included, or is provided with a handle slot (not shown) for covering most of the spin chamber 100 while allowing just the handle 40 to protrude therefrom.

Moreover, in such an embodiment the lever means 220 is not for disengaging the mop head 30 from the handle 40, but rather rotationally unlocking the mop head 30 from spinning with respect to the handle 40. With such an arrangement the lever means 220 is actuated only when the mop head 30 is engaged to the shaft 180 and the operator desires the mop head spinning means 110 to be activated. Indeed, such actuation of the lever means 220 may cause the button 490 to become actuated (not shown), thereby starting the washing and drying cycle of the control circuit 480. In using such an embodiment, a user places the mop head 30 onto the shaft 180 by lifting the mop head 30 with the handle 40. Once engaged with the shaft 180 the lever means 220 is actuated, and the mop head 30 becomes rotationally unlocked from the handle 40 and the mop head spinning means 110 is activated. Alternately, the act of engaging the mop head 30 onto the shaft 180 may rotationally free the mop head 30 from the handle 40 and actuate the head spinning means 110, thereby eliminating the need for the lever means 220 completely. A mechanical engineer or others skilled in the art would be able to effect such alternate arrangements of the mop assembly 20 to enable the mop head 30 to rotate only when desired by the operator.

The bucket assembly 90 preferably further includes an ozone generator 450 fluidly connected to the lower-most portion 370 of the spin chamber 100 through a tube 455. As such, when the ozone generator 450 is activated, ozone gas 460 is caused to bubble up through any fouled liquid 315 contained within the spin chamber 100. Further, ozone gas 460, upon reaching the surface of the fouled liquid 315, fills the open space of the spin chamber 100 and helps to sterilize any bacteria and germs located therein, such as on the mop head 30. Ozone gas 460 is preferred, but alternate sterilizing fluids or gases could be introduced to the fouled liquid 315 without departing from the spirit and scope of the present invention.

The dry chamber 105 includes a control circuit 480 that electrically connects the power source 170 to the motor 150, the ozone generator 450, and the pump and spraying means 310 as needed. Such a control circuit preferably includes a button 490 for activating a washing and drying cycle of the mopping system 10, wherein the motor 150 is activated to spin the mop head 30 at a relatively low speed, such as between 40 and 60 RPM, while the pump and spraying means 310 sprays the clean water solutions 320 onto the lower side 50 of the mop head 30 to clean the mop head 30. The ozone generator 450 is also activated. The control circuit then, after a predetermined period of time such as 15 to 30 seconds, deactivates the pump and spraying means 310 and increases the speed of the motor 150 to preferably between 400 and 600 RPM, to force effective centrifugal drying of the mop head 30 and the water absorbing strands 520. As the strands 520 do not touch the inner wall 115 of the spin chamber 100, any water 315 therein is quickly expunged therefrom. After a second predetermined period of time, such as 30 to 60 seconds, the motor 150 is deactivated, and then, after a third predetermined period of time, such as five minutes, the ozone generator 450 is deactivated so as not to overly expose the surrounding areas to ozone gas.

The button 490 may be located through the top surface 440 of the bucket assembly 90, under the top cover 430 when the top cover 430 is in an open position (FIGS. 1 and 2). As such, the button 490 may not be depressed unless the top cover 430 is closed (FIGS. 3 and 4), ensuring that the motor 150 does not spin when the cover 430 is open for safety.

Alternatively, a second button 495, in series with the button 490, may be included to sense if a mop head 30 has been engaged with the mop head engagement means 120. If not, the second button 495 remains open, thereby preventing the motor 150 from spinning unless both the mop head 30 is in place on the shaft 180 and the cover 430 is closed. The second button 495 may be mounted proximate the shaft 180 to detect the weight of the mop head 30 thereon, or using some other commonly known button mounting arrangement. Clearly, the second button 495 may be included without button 490, such that merely engaging the mop head 30 on the shaft 180 starts the washing and drying cycle. In such an embodiment, a delay of several seconds may be introduced to give the operator time to withdraw the handle 40 completely from the mop head 30. However, preferably, the button 490 is included to ensure that the cover 430 is closed prior to starting the washing and drying cycle.

In operation, a number of methods of use are preferred. The simplest method is to minimally provide the mop head 30 and a simplified bucket assembly 90, engage the mop head 30 to the mop head spinning means 110 of the bucket assembly 90, and activate the spinning means 110 to dry the mop head 30. The mop head spinning means 110 in such a case is switchably connected to the power source 170 in a conventional manner, such as directly through a switch or button 490, or by plugging a power cord into a wall outlet (not shown), and the motor 150 of the mop head spinning means 110 rotates the shaft 180 to spin the mop head 30. When the button 490 is released, or the power cord is pulled from the wall outlet, the motor 150 is deactivated. Such a simplified embodiment, however, requires the operator to judge when the mop head 30 is dry, and such a judgment may or may not be accurate.

In such an embodiment, the mop head spinning means 110 may be used over an existing sink (not shown), the sink acting as the spin chamber 100. Such an embodiment requires that the motor 150 is mounted in some fashion, such as in a dry chamber 105 enclosure resting on a countertop proximate the sink with the shaft 180 provided on a cantilevered arm extending out over the sink (not shown), or the like. Alternatively, the motor 150 may be mounted in an inverted cone dry chamber 105 with the shaft 180 emanating from the top thereof (not shown), the inside of the cone being sealed from the water dripping down from the mop head 30. While such embodiments are the simplest configurations for the present invention, the safety risk of such embodiments are significantly higher, and the ease of use is considerably less than that of the preferred embodiments, as water spinning off of the mop head 30 is not fully contained and can spray out of the sink in such embodiments. Therefore, while these embodiments fall within the scope of the present invention, these embodiments are not preferred.

Additional steps of spraying clean water 320 onto the lower surface 50 of the mop head 30 may be included in the method of use of the present invention. Such spraying of clean water 320 may occur either before or after the main drying cycle (wherein the mop head 30 is spun at a relatively high rotational speed to effect centrifugal drying) and such spraying may be termed a wash cycle. Thus, various cycles, such as dry only, wash only, wash-dry, dry-wash, wash-dry-wash, or dry-wash-dry cycles, may be easily incorporated into the invention by altering the programming of the control circuit 480. Moreover, a plurality of buttons 490 may be included (not shown), each button 490 having a dedicated cycle type, such that the operator may select the desired cycle type based on the requirements of a particular floor cleaning situation.

While a particular form of the invention has been illustrated and described, it will be apparent that various modifications can be made without departing from the spirit and scope of the invention. For example, the relative configurations of the spin and dry chambers 100,105 may be altered, as may aspects of the mop assembly 20 and how the mop head 30 is attached to the handle 40. Such modifications do not affect the scope of the invention and do not substantially alter the method of its use. Accordingly, it is not intended that the invention be limited, except as by the appended claims.

What is claimed is:

1. A mopping system comprising:
    a mop assembly comprising a mop head and an elongated handle, the mop head including a floor-engageable lower surface and a handle attachment means for attaching the mop head to a lower end of the handle; and
    a bucket assembly comprising a spin chamber and a mop head spinning means, the mop head spinning means comprising a mop head engagement means rotationally supported at least partially within the spin chamber, a rotational driving means, comprising a motor electrically connected to a power source, connected to the mop head engagement means such that the rotational driving means rotationally drives the mop head engagement means, the rotational driving means being physically isolated away from moisture contained in the spin chamber, the mop head spinning means engageable with the mop head to rotationally support the mop head within the spin chamber away from an inner wall of the spin chamber, the mop head engagement means being a non-circular shaft rotationally coupled to a rotating shaft of the motor at a lower end of the non-circular shaft, the lower surface of the mop head further includes a centrally located shaft aperture for slidably receiving the non-circular shaft of the mop head engagement means therein and rotationally locking the mop head thereto;
    whereby with the mop head engaged to the mop head spinning means, the mop head spinning means may be caused to spin the mop head about a rotational axis thereof to effect centrifugal drying of the mop head.

2. The mopping system of claim 1 wherein the spin chamber is generally toroid-shaped and has an inverted frustoconical inner wall for rotationally supporting the shaft coaxially on an outer surface thereof with at least one set of bearings mounted thereon.

3. The mopping system of claim 2 wherein the bucket assembly includes a hollow generally toroid-shaped clean water tank having an inverted frustoconical aperture formed therein, the clean water tank gravitationally held onto the frustoconical inner wall of the spin chamber, the aperture therein large enough to cause the clean water tank to be supported below the lower surface of the mop head when the mop head is engaged with the mop head engagement means.

4. The mopping system of claim 3 wherein the clean water tank includes a pump and spraying means for pumping clean water from the clean water tank and spraying it onto the lower surface of the mop head when the mop head is engaged with the mop head engagement means.

5. The mopping system of claim 4 wherein the bucket assembly further includes a control circuit electrically connected to the motor and the water pump for controlling activation and deactivation of the motor, speed of the motor, and activation and deactivation of the pump and spraying means.

6. The mopping system of claim 5 wherein the control circuit includes a button for activating a washing and drying cycle, wherein the motor is activated to spin the mop head at a relatively low speed while the pump and spraying means sprays a clean water solution onto the lower side of the mop head to clean the mop head, and then to spin the mop head at a relatively high speed to effect drying of the mop head.

7. The mopping system of claim 6 wherein the control circuit button is mounted proximate to the shaft, whereby it is activated by engaging the mop head to the mop bead engagement means.

8. The mopping system of claim 1 wherein the bucket assembly further includes a control circuit electrically connected to the motor for controlling the speed of the motor.

9. The mopping system of claim 1 wherein the bucket assembly includes an ozone generator fluidly connected to a lower-most portion of the spin chamber such that when the ozone generator is activated, ozone gas is caused to bubble up through any liquid contained in the spin chamber.

10. The mopping system of claim 9 wherein the bucket assembly further includes a control circuit electrically connected to the ozone generator for controlling the activation of the mop head spinning means and the activation of the ozone generator.

11. The mopping system of claim 3 wherein the clean water tank has a water inlet port in fluid communication therewith and exiting at the top side of the bucket assembly, whereby the clean water tank may be filled with a clean water solution by pouring said solution into the water inlet port, with the clean water tank remaining inside the bucket assembly.

12. The mopping system of claim 6 wherein the bucket assembly includes a top cover slidably engaged with a top surface thereof for covering the mop head when the mop head is engaged with the mop head engagement means, and where the control circuit button is mounted proximate to the shaft and is electrically connected in series with a second button mounted proximate to the cover, whereby the control circuit is activated by engaging the mop head to the mop head engagement means and closing the top cover.

13. A mopping system comprising:
    a mop assembly comprising a mop head and an elongated handle, the mop head including a floor-engageable lower surface and a handle attachment means for attaching the mop head to a lower end of the handle, the elongated handle further including a biased lever means at an upper end thereof mechanically coupled to a mop head attachment means fixed to the lower end of the handle, the mop head attachment means of the handle and the handle attachment means of the mop head cooperating to retain the mop head pivotably on the lower end of the handle when the lever means is in a normal position, and the mop head attachment means of the handle and the handle attachment means of the mop head cooperating to mechanically disconnect the mop head from the lower end of the handle when the lever means is in an actuated position; and
    a bucket assembly comprising a spin chamber and a mop head spinning means, the mop head spinning means engageable with the mop head to rotationally support the mop head within the spin chamber away from an inner wall of the spin chamber;
    whereby with the moo head engaged to the mop head spinning means, the mop head spinning means may be caused to spin the mop head about a rotational axis thereof to effect centrifugal drying of the mop head.

14. A mopping system comprising:

a mop assembly comprising a mop head and an elongated handle, the mop head including a floor-engageable lower surface and a handle attachment means for attaching the mop head to a lower end of the handle; and a bucket assembly comprising a spin chamber and a mop head spinning means, the mop head spinning means engageable with the mop head to rotationally support the mop head within the spin chamber away from an inner wall of the spin chamber, the bucket assembly further including a drain plunger protruding at one end of the bucket assembly and extending down through the bucket assembly to a rubber seal for sealing a drain aperture in a lower-most section of the spin chamber, the drain plunger being biased upward such that the rubber seal engages and seals the drain aperture in a normal position, the drain plunger causing the rubber seal to disengage the drain aperture of the spin chamber when forced into an actuated position;

whereby with the mop head engaged to the mop head spinning means, the mop head spinning means may be caused to spin the mop head about a rotational axis thereof to effect centrifugal drying of the mop head.

15. The mopping system of claim 14 further including a drain water container open on one side and adapted to fit under the drain aperture between the bucket assembly and the floor surface, whereby with the drain aperture set in the actuated position, liquid from within the spin chamber is completely drained into the drain water container.

* * * * *